Figure 2:
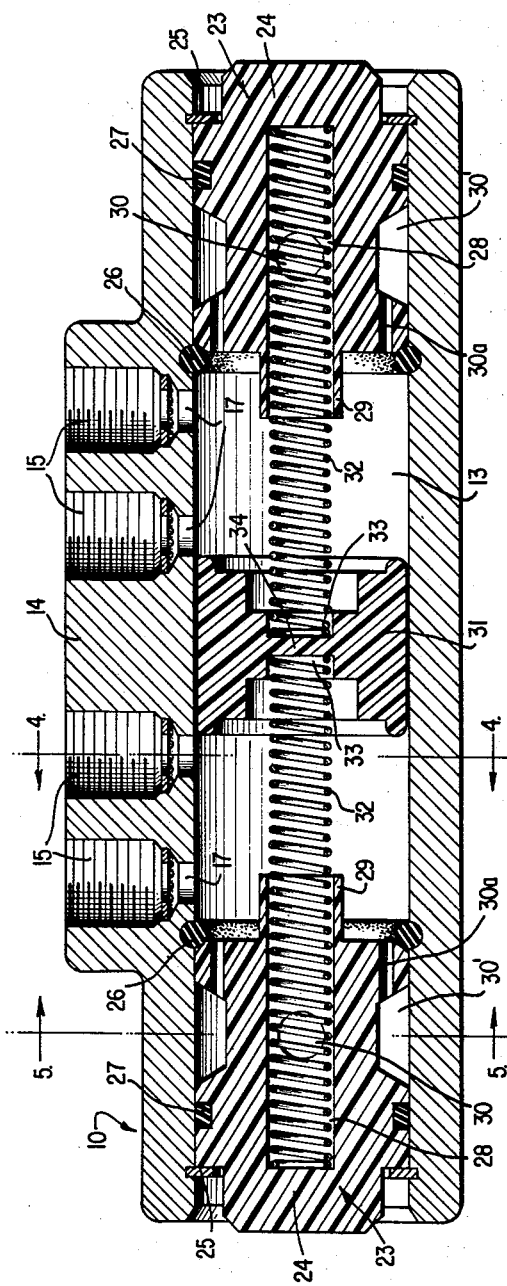

Sept. 15, 1964  C. V. JONES, SR., ET AL  3,148,693
SAFETY VALVE DEVICE FOR FLUID PRESSURE BRAKE SYSTEMS
Filed Sept. 17, 1963
2 Sheets-Sheet 1
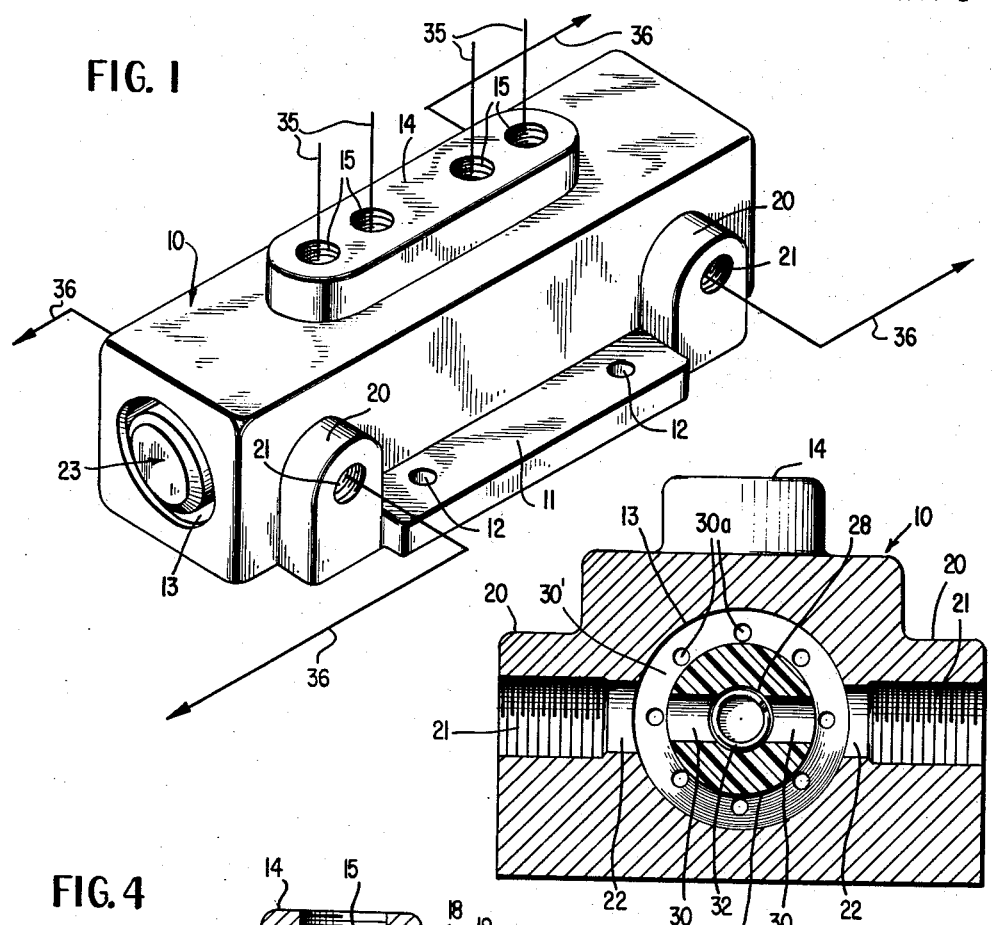
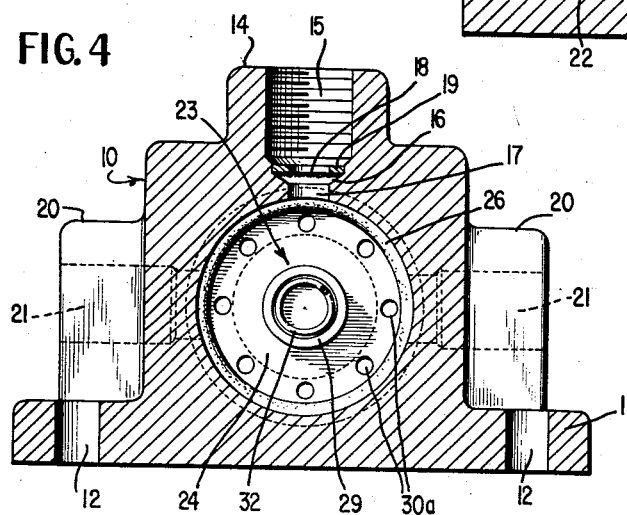
INVENTORS.
COY V. JONES, SR.
WALTER ENGELS
BY
*ATTORNEY*

Sept. 15, 1964  C. V. JONES, SR., ET AL  3,148,693
SAFETY VALVE DEVICE FOR FLUID PRESSURE BRAKE SYSTEMS
Filed Sept. 17, 1963  2 Sheets-Sheet 2

INVENTORS.
COY V. JONES, SR.
WALTER ENGELS
BY
B. P. Fishburne, Jr.
ATTORNEY

United States Patent Office 3,148,693
Patented Sept. 15, 1964

3,148,693
SAFETY VALVE DEVICE FOR FLUID PRESSURE
BRAKE SYSTEMS
Coy V. Jones, Sr., Greer, S.C., and Walter Engels, Tryon, N.C., assignors to Southern Machinery Company, Greer, S.C., a corporation of South Carolina
Filed Sept. 17, 1963, Ser. No. 309,454
3 Claims. (Cl. 137—118)

This invention relates to safety devices for fluid pressure operated brakes and the like.

The invention may be used in various types of fluid pressure braking systems employing pneumatic or hydraulic pressure.

The primary object of the invention is to provide a compact, rugged and simplified safety valve device for fluid pressure braking systems, including means to assure continued and safe operation of at least a part of the system, should brake failure occur in another part of the system.

More specifically, by means of the novel safety valve unit embodying the invention, should brake failure occur at the front wheels of the vehicle, rendering the front wheel brakes useless, the back wheel brakes will continue to operate to bring the vehicle to a safe stop, and conversely, should the rear wheel brakes fail, the front wheel brakes will continue to operate satisfactorily Another very important object of the invention is to provide a simplified time delay or retarded action feature in the operation of the pressure differential sensing piston of the safety valve unit, thereby overcoming a well-known and common deficiency of the prior art in somewhat similar units, caused by oversensitivity of the valve means which may cause the unit to operate prematurely because of minor pressure fluctuations in the pressure supply lines leading to the safety unit. That is to say, the invention unit, because of the simplified built-in delayed action feature, will not operate falsely in response to slight pressure fluctuations in the unit supply lines but will only operate or function in response to a true brake failure in one part of the system. According to the invention, this time delay feature is provided by the simple provision of a clearance space between the main bore of the valve body and the sensing piston, rendering the structure highly economical to manufacture and very reliable and efficent in operation.

An additional object is to provide a safety valve device of the mentioned character which is constructed throughout for ease of machining and other manufacturing processing and which will require little or no maintenance, the specific device of the invention having been extensively tested and found to operate with high efficiency in accordance with the various constructional features which will be described in detail.

Other objects and advantages of the invention will be apparent during the course of the following description.

Figure 3:
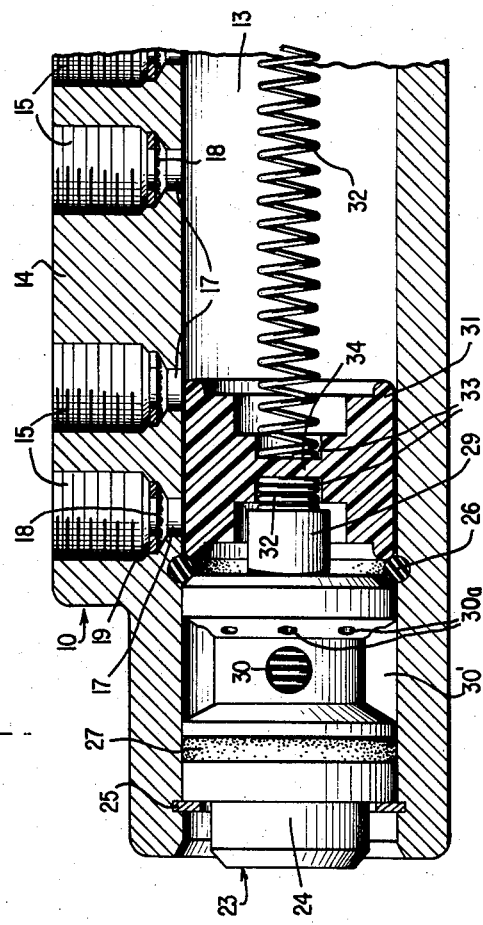

In the accompanying drawings forming a part of this application and in which like numerals are employed to designate like parts throughout the same, FIGURE 1 is a perspective view of a safety valve unit for fluid pressure brake systems according to the invention, fluid flow lines being shown diagrammatically, FIGURE 2 is a central vertical longitudinal section on an enlarged scale through the valve unit of FIGURE 1, and with the movable sensing piston in a neutral position as where there is no failure in the braking system, FIGURE 3 is a fragmentary section similar to FIGURE 2, partly in elevation, and showing the movable piston shifted in one direction responsive to pressure differential caused by failure in a part of the braking system, FIGURE 4 is a transverse vertical section taken on line 4—4 of FIGURE 2, and FIGURE 5 is a similar section taken on line 5—5 of FIGURE 2.

In the drawings, wherein for the purpose of illustration is shown a preferred embodiment of the invention, the numeral 10 designates a unitary valve body or casing, adapted to be formed as an aluminum casting or the like and being generally rectangular or block-like and elongated. As shown in the drawings, the casing 10 has an integral bottom mounting flange 11, apertured at 12, on opposite sides of the casing proper, for attachment to a suitable flat support surface at a convenient place on the vehicle, such as a trailer truck or like automotive vehicle.

The unitary casing 10 has a relatively large central longitudinal cylindrical through bore 13 of uniform diameter for ease of manufacturing and for ease of assembling component parts therein. An upstanding boss 14 is formed on top of the casing 10 centrally thereof and has pairs of spaced screw-threaded openings 15 formed therein, leading into somewhat tapered reduced recesses 16, in turn leading into further reduced ports 17, intersecting the through bore 13 at right angles thereto at points equidistantly spaced from the ends of the through bore and the longitudinal center thereof. Disc filter screens 18 and back-up washers 19 are mounted within the recesses 16 to prevent the entrance of foreign matter into the bore 13.

The casing 10 is further provided on opposite sides thereof and near and inwardly of its ends with bosses 20 having screw-threaded openings 21 formed therethrough and leading to reduced passages 22 which intersect the main through bore 13 at right angles thereto, on opposite sides thereof, at diametrically opposed points. The passages or ports 22 are in axial alignment on opposite sides of the bore 13 and are spaced ninety degrees circumferentially of the ports 17 and outwardly thereof, longitudinally of the casing 10, as shown clearly in FIGURES 1 and 2. The ports 17 and 22 extend radially of the through bore 13 and the ports 22 are spaced equidistantly from the respective ports 17, FIGURE 2.

It may thus be seen that the valve casing 10 is entirely symmetrical about its longitudinal and transverse center lines, making for easy installation and assembling of parts.

Fixedly mounted within the opposite end portions of the main through bore 13 are identical closure plug units 23 formed of tough plastic material, molded nylon, or other like material which is resistant to corrosion and strong and substantially rigid. The plug units 23 having generally cylindrical body portions 24, preferably having a snug fit within the bore 13 and firmly anchored therein substantially immovably by metal snap rings 25 near the outer ends of the through bore, and by rubber O-ring seals 26 adjacent the inner ends of the plug body portions and axially outwardly of the ports 17, FIGURE 2. Additional O-ring seals 27 are provided near and inwardly of the snap rings 25 to further seal the closure plug units 23 in a fluid tight manner within the main bore 13. The plug units 23 are readily removable and installable through the ends of the bore 13 by first merely removing the snap rings 25 from their seating grooves in the casing 10.

Each plug body portion 24 has a central axial bore 28 opening through its inner end and therefore communicating directly with the main bore 13 near the ports 17, FIGURE 2. The opposite ends of the bores 28 are closed and terminate within the body portions 24 substantially adjacent the snap rings 25. At their inner ends, the plug body portions 24 preferably have integral reduced axial tubular extensions 29 as shown. Each plug body portion 24 has a pair of diametrically opposed cross ports 30, FIGURE 5, intersecting the bores 28 at right angles thereto and near the longitudinal centers thereof.

The outer end of the cross ports 30 communicate directly with annular chambers 30' formed by externally grooving the plug bodies 24 intermediate the seals 26 and 27. The chambers 30 in turn communicate with passages 22 and threaded openings 21. It is not necessary to align the cross ports 30 with the passages 22 in assembly as shown in FIGURE 5 due to the annular construction of the chambers 30'.

The plug body portions 24 are further provided in their inner ends with a plurality of circumferentially spaced relatively small openings 30a which also place the annular chambers 30' in fluid flow communication with the main bore 13, as shown. These openings 30a supplement the flow of fluid from the ports 17 and main bore 13 through the bores 28 and cross ports 30 to the chambers 30' and passages 22 during operation.

A single intermediate movable fluid pressure differential sensing piston and valve element 31 preferably formed of molded nylon or the like is placed in the bore 13 and has a diameter of about .007 to .010 (thousandths) of an inch less than the diameter of the main bore 13. The axial length of the piston 31 is such that when it is in the neutral or balanced position, FIGURE 2, it is centered between the pairs of ports 17 and the same are fully uncovered and communicate with the bore 13 on opposite sides of piston 31. As shown in FIGURE 3, when the piston 31 moves to the left or to the right in the bore 13, it will completely cover one pair of the ports 17 and block the flow of fluid from such pair to the adjacent bore 28 and openings 30a. At this time, no leakage will occur around the undersized piston 31, FIGURE 3, because one end thereof is engaging the adjacent O-ring seal 26.

However, the undersized construction of the piston 31 in the neutral position thereof constitutes a very important feature of the invention in that this provides a retarded or delayed action of the piston 31 toward either side of the neutral position when there is unbalanced pressure on either end of the piston caused by brake failure at the front or back wheels. When this occurs, there will be slight leakage of fluid through the small annular space between the piston 31 and the bore 13 and although the piston will move toward one or the other of the seals 26 quite quickly upon brake failure, there will be a slight delayed action which is desirable in order that the invention device not be too sensitive. This sensitivity is not too critical in the instance of true brake failure, but when there are minor fluctuations in pressure in the main bore 13 and not actual brake failure, it is desired that these pressure fluctuations have no influence on the piston 31 or cause no appreciable movement thereof from the neutral position in FIGURE 2. This is the main purpose of the space between the piston 31 and the bore 13, namely to allow fluid at this time to bleed by the piston in either direction without moving it. When there is true brake failure causing an abrupt drop in pressure on one side of the piston 31, it will move toward one end of the bore 13 after a slight time delay interval afforded by the clearance between the piston and main bore 13.

The piston 31 is maintained centered or neutral by balanced compression springs 32 on opposite sides thereof, having corresponding ends seated within recesses 33 of the piston and bearing upon a central wall portion 34 thereof. The other ends of the springs bear upon the plug body portions 24 and extend within the bores 28. The fluid in the system thus passes directly through the springs 32 in the main bore 13 and plug bores 28 during operation of the device.

The springs 32 maintain the piston 31 in the neutral position between the ports 17 when there is balanced pressure on opposite sides of the piston and regardless of minor pressure fluctuations, as explained. The springs 32 have relatively light tension and will yield readily to permit movement of the piston 31 in either direction due to brake failure of either the front or rear wheel brakes and a resultant drop in pressure on one side of the piston. When the system is normal and without failure, the piston 31 effectively separates the two portions of the bore 13 between plug body portions 24 which communicate respectively with one pair of ports 17 and one of the passages 22 and associated elements.

In operation, compressed air or other pressurized fluid from a main source and main control valve, not shown, is divided for passage through pairs of supply lines 35, FIGURE 1, suitably connected in the openings 15. Similarly, outlet lines for fluid are connected in and from the openings 21 to the front and rear wheel brakes, as indicated diagrammatically at 36. Since the invention unit is symmetrical in design, no care need be exercised in connecting a particular end of the casing 10 with the lines 36 and either pair of openings 21 may be connected with either pair of lines 36 and the same is true regarding the openings 15 and inlet lines 35.

As long as there is no brake failure in the system, equal fluid pressure will be maintained on both sides of the piston 31 and the same will be centered, FIGURE 2, and the invention unit will supply working pressure to the brakes of the front and rear vehicle wheels simultaneously. That is to say, with the piston 31 centered by the springs 32 as in FIGURE 2, and with substantially equal pressure supplied through the ports 17 on opposite sides of the piston, such equal pressure is transmitted through the bores 28 and openings 30a and chambers 30', cross ports 30 and passages 22 and openings 21 for transmission to the front and rear wheel brakes.

When, for any reason, the front or rear wheel brakes fail, such as failure in the fluid pressure supply lines leading thereto, the fluid in the system on one side of piston 31 will begin to escape and pressure in the main bore 13 on such side of piston 31 will drop suddenly while the pressure on the opposite side of the piston will be substantially uneffected except for some leakage around the piston 31, for time delay purposes as previously explained. As shown in FIGURE 3, this unbalanced pressure on piston 31 will cause the same to shift axially toward the low pressure side until the piston abuts the adjacent seal 26 and covers the adjacent pair of inlet ports 17. This blocks the flow of working fluid to the damaged portion of the braking system and allows the operative portion of the system to function safely in a normal manner without leakage.

When the defect in the braking system is corrected and the balanced pressure condition on opposite sides of the piston 31 is re-established, the piston will again be centered or balanced as in FIGURE 2 and both pairs of ports 17 are uncovered so that pressurized working fluid can again be transmitted by the invention unit to the properly operating front and rear wheel brakes. When there is no application of brakes, and no substantial build-up of pressure in the main bore 13 on opposite sides of the piston 31, the springs 32 will function to maintain the piston centered between the pairs of ports 17.

The tubular extensions 29 lend added support for the springs 32, and when the piston 31 is shifted to one extreme position as shown in FIGURE 3, the extension 29 enters the recessed end of the piston telescopically, thus rendering the structure compact and reducing its overall length. The construction throughout is simplified for ease of manufacturing, assembly and maintenance, and it is thought that the advantages of the construction over the prior art will be readily apparent to those skilled in the art. The provision of the two pairs of inlet ports 17 and the openings 30a, bores 28 and cross ports 30 assure that an adequate flow of fluid will be transmitted to the outlet passages 22 to meet the requirements of the system.

It is to be understood that the form of the invention herewith shown and described is to be taken as a preferred example of the same, and that various changes in the shape, size and arrangement of parts may be resorted to,

Having thus described the invention, we claim:

1. A safety valve unit for fluid pressure brake systems comprising a unitary valve casing which is symmetrically formed transversely and longitudinally for ease of installation and comprising an elongated block-like body portion having a relatively large longitudinal cylindrical through bore of constant diameter, said casing provided in one side thereof with pairs of transverse inlet ports opening into the through bore and spaced equidistantly from the ends of the casing and the longitudinal center thereof, said casing having a flat mounting face on the side thereof opposite the inlet ports, said casing having pairs of opposed transverse outlet passages on opposite sides thereof and opening into the through bore and spaced outwardly equidistantly of said inlet ports and spaced inwardly equidistantly from the ends of the casing, closure plug bodies within end portions of the through bore and outwardly of the inlet ports and having grooves forming annular passages exteriorly of the plug bodies and communicating with said outlet passages, said plug bodies having longitudinal bores opening through their inner ends only and communicating with the bore of the casing inwardly of the plug bodies, said plug bodies having cross ports intermediate their ends intersecting the annular passages and the bores of the plug bodies, said plug bodies having auxiliary longitudinal ports outwardly of the bores thereof and opening into said annular passages and through the inner ends of the plug bodies, resilient ring seals at the inner ends of the plug bodies and in the bore of the casing longitudinally outwardly of said inlet ports and radially outwardly of said auxiliary longitudinal ports, a single piston within the bore of the casing and being of smaller diameter than the casing bore to allow some leakage of fluid around the piston, said piston adapted to be centered between said pairs of inlet ports to completely uncover the same and shiftable into engagement with either of said ring seals to completely cover one pair of said inlet ports, said piston being recessed in opposite ends thereof, and balanced compressible coil springs on opposite sides of said piston having corresponding end portions within the bores of the plug bodies and other corresponding end portions within the piston recesses.

2. The invention as defined by claim 1, and additional ring seals on the plug bodies longitudinally outwardly of said annular passages, and snap rings at the outer ends of the plug bodies for releasably securing the plug bodies within the bore of the casing between the snap rings and the first-named ring seals.

3. A safety valve unit for fluid pressure brake systems comprising a unitary valve casing which is symmetrically formed transversely and longitudinally for ease of installation and comprising an elongated block-like body portion having a relatively large longitudinal cylindrical through bore of constant diameter, said casing provided in one side thereof with pairs of transverse inlet ports opening into the through bore and spaced equidistantly from the ends of the casing and the longitudinal center thereof, said casing having a flat mounting face on the side thereof opposite the inlet ports, said casing having pairs of opposed transverse outlet passages on opposite sides thereof and opening into the through bore and spaced outwardly equidistantly of said inlet ports and spaced inwardly equidistantly from the ends of the casing, closure plug bodies within end portions of the through bore and outwardly of the inlet ports and having grooves forming annular passages exteriorly of the plug bodies and communicating with said outlet passages, said plug bodies having longitudinal bores opening through their inner ends only and communicating with the bore of the casing inwardly of the plug bodies, said plug bodies having cross ports intermediate their ends intersecting the annular passages and the bore of the plug bodies, resilient seal rings at the inner ends of the plug bodies and in the bore of the casing longitudinally outwardly of said inlet ports, a single piston within the bore of the casing and being of smaller diameter than the casing bore to allow some leakage of fluid around the piston, said piston adapted to be centered between said pairs of inlet ports to completely uncover the same and shiftable into engagement with either of said ring seals to substantially completely cover one pair of said inlet ports, said piston being recessed in opposite ends thereof, balanced compressible coil springs on opposite sides of said piston having corresponding end portions within the bores of the plug bodies and other corresponding end portions within the piston recesses, and tubular extensions on the inner ends of said plug bodies receiving said springs to stabilize the same and adapted to enter the recesses of the piston upon movement of the piston toward one or the other of the plug bodies.

References Cited in the file of this patent

UNITED STATES PATENTS

| | | |
|---|---|---|
| 400,173 | Bell | Mar. 26, 1889 |
| 2,854,016 | Margida | Sept. 30, 1958 |
| 2,965,730 | Regoli et al. | Dec. 20, 1960 |
| 2,979,365 | Jones | Apr. 11, 1961 |